United States Patent
Urquhart et al.

(10) Patent No.: US 8,171,416 B2
(45) Date of Patent: May 1, 2012

(54) CONFIRMATION SYSTEM AND METHOD FOR INSTANT MESSAGING

(75) Inventors: Ryan L. Urquhart, Durham, NC (US); David J. Schell, Raleigh, NC (US); Vonetta M. Urquhart, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1971 days.

(21) Appl. No.: 11/092,145

(22) Filed: Mar. 29, 2005

(65) Prior Publication Data

US 2006/0224968 A1    Oct. 5, 2006

(51) Int. Cl.
*G06F 3/00* (2006.01)
(52) U.S. Cl. .......................... 715/758; 715/751; 715/753
(58) Field of Classification Search .................. 715/751, 715/752, 753, 758, 764
See application file for complete search history.

(56) References Cited

U.S. PATENT DOCUMENTS

| | | | | |
|---|---|---|---|---|
| 6,460,074 | B1* | 10/2002 | Fishkin .......................... | 709/206 |
| 7,305,470 | B2* | 12/2007 | Tom et al. ....................... | 709/225 |
| 2001/0034723 | A1 | 10/2001 | Subramaniam | |
| 2002/0083136 | A1 | 6/2002 | Whitten, II | |
| 2002/0144273 | A1* | 10/2002 | Reto ................................ | 725/86 |
| 2002/0161721 | A1* | 10/2002 | Yuan et al. ...................... | 705/65 |
| 2002/0178187 | A1* | 11/2002 | Rasmussen et al. .......... | 707/513 |
| 2004/0078595 | A1 | 4/2004 | Kent, Jr. et al. | |
| 2004/0078596 | A1 | 4/2004 | Kent, Jr. et al. | |
| 2004/0128552 | A1 | 7/2004 | Toomey | |
| 2004/0148346 | A1* | 7/2004 | Weaver et al. ................ | 709/204 |
| 2004/0221224 | A1 | 11/2004 | Blattner et al. | |
| 2004/0225884 | A1* | 11/2004 | Lorenzini et al. ............. | 713/176 |
| 2005/0216742 | A1* | 9/2005 | Wong et al. ................... | 713/176 |
| 2005/0277474 | A1* | 12/2005 | Barry .............................. | 463/42 |
| 2006/0087674 | A1* | 4/2006 | Lusen et al. ................. | 358/1.14 |
| 2008/0147263 | A1* | 6/2008 | Sinex ............................. | 701/29 |

OTHER PUBLICATIONS

Mirabilis, ICQ: Frequently Asked Questions—Offline Messaging, Mar. 1, 2004.*
Microsoft, Microsoft Office Outlook 2003 Screen Capture, Copyright 2003.*

* cited by examiner

*Primary Examiner* — Ba Huynh
(74) *Attorney, Agent, or Firm* — Jeanine S. Ray-Yarletts

(57) ABSTRACT

A system and method for confirming messages being sent within an instant messaging environment. An instant messaging system is disclosed, comprising a confirmation enablement system that allows a user to selectively enable a requires confirmation option for a contact associated with the user; and a send message interface that displays a confirmation requirement for messages being sent to the contact if the requires confirmation option is enabled, wherein the confirmation requirement must be confirmed by the user before the message can be sent.

16 Claims, 2 Drawing Sheets

CONFIRMATION SYSTEM AND METHOD FOR INSTANT MESSAGING

BACKGROUND OF THE INVENTION

1. Technical Field

The present invention relates generally to instant messaging, and more specifically relates to a system and method for confirming the recipient of instant messaging (IM) communication before the message is sent.

2. Related Art

There exist various instant messaging (IM) systems that allow co-workers, friends, etc., to converse with each other for business and social reasons in real-time. AOL™, MSN™, and YAHOO™ provide some of the more commonly used IM programs. For the most part, these IM programs are consistent in the way that users input and send information, add contacts to their contact lists, etc. Many of the programs provide users with the technology to create communities in which they can choose to engage in public chats with people whom they have never met, but share an interest.

One of the challenges with such a real-time communication system is that confidential or highly sensitive information could be inadvertently sent to the wrong contact. This can occur when, e.g., the sending party mistakenly selects the wrong contact to receive the sensitive information. This is particularly prone to occur in IM systems because users may be communicating with multiple contacts at the same time, and contacts are generally identified by a contact name or nickname that may be different from their actual name.

Accordingly, a need exists for a system that would give the sending user an opportunity to confirm the identity of a contact before the message is sent.

SUMMARY OF THE INVENTION

The present invention addresses the above-mentioned problems, as well as others, by providing an instant messaging (IM) program that allows a user to selectively enable a "Requires Confirmation" option for contacts on the user's contact list. Thereafter, messages sent to those contacts must be confirmed by the user before the message can be sent.

In a first aspect, the invention provides an instant messaging system, comprising: a confirmation enablement system that allows a user to selectively enable a requires confirmation option for a contact associated with the user; and a send message interface that displays a confirmation requirement for messages being sent to the contact if the requires confirmation option is enabled, wherein the confirmation requirement must be confirmed by the user before the message can be sent.

In a second aspect, the invention provides a computer program product stored on a computer readable medium for implementing an instant messaging system, comprising: means for allowing a user to selectively enable a requires confirmation option for a contact associated with the user; and means for displaying a confirmation requirement for messages being sent to the contact if the requires confirmation option is enabled, wherein the confirmation requirement must be confirmed by the user before the message can be sent.

In a third aspect, the invention provides a method for implementing an instant messaging system, comprising: enabling a requires confirmation option for a contact associated with a user; writing a message to the contact; and displaying a confirmation requirement for the message being sent to the contact, wherein the confirmation requirement must be confirmed by the user before the message can be sent.

In a fourth aspect, the invention provides a method for deploying an instant messaging application, comprising: providing a computer infrastructure being operable to: allow a user to selectively enable a requires confirmation option for a contact associated with the user; and display a confirmation requirement for messages being sent to the contact if the requires confirmation option is enabled, wherein the confirmation requirement must be confirmed by the user before the message can be sent.

In a fifth aspect, the invention provides computer software embodied in a propagated signal for implementing an instant messaging system, the computer software comprising instructions to cause a computer to perform the following functions: allow a user to selectively enable a requires confirmation option for a contact associated with the user; and display a confirmation requirement for messages being sent to the contact if the requires confirmation option is enabled, wherein the confirmation requirement must be confirmed by the user before the message can be sent.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION OF THE INVENTION

Figure 1:
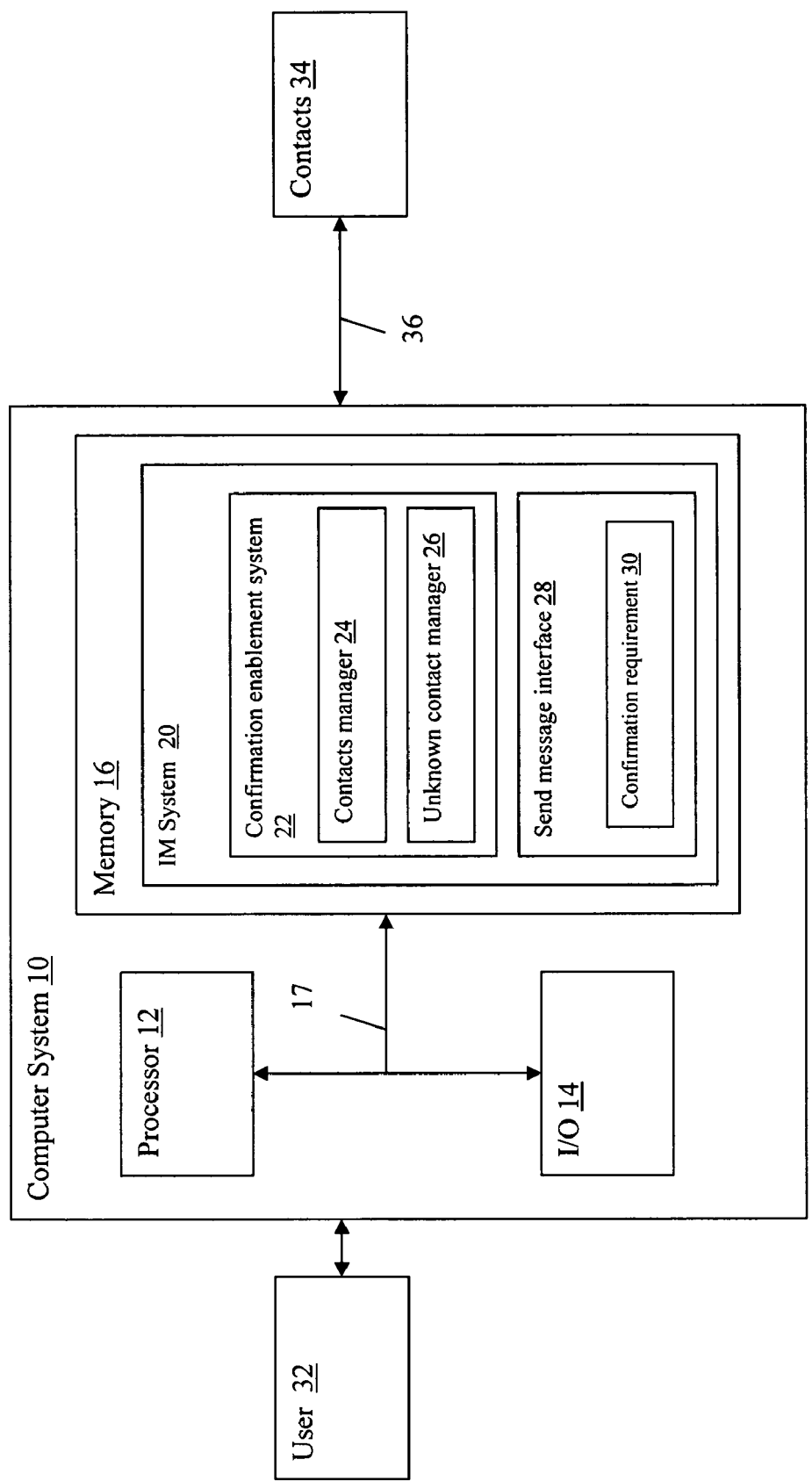
FIG. 1 depicts a computer system having an instant messaging system in accordance with the present invention.

Referring now to the drawings, FIG. 1 depicts a computer system 10 having an instant messaging (IM) system 20. In addition to the features found on most typical IM programs, IM system 20 includes: (1) a confirmation enablement system 22 that allows user 32 to selectively enable a "requires confirmation option" for one or more contacts 34; and (2) a send message interface 28 that causes a confirmation requirement 30 to be presented to the user 32, wherein the confirmation requirement 30 must be confirmed before a message can be sent to a contact for which the requires confirmation option has been enabled. An example of a send message interface 28 is described below with reference to FIG. 3.

Confirmation enablement system 22 may be implemented in various manners. In one illustrative embodiment, the user 32 can enable the requires confirmation option via a contacts manager 24, which is described in further detail in FIG. 2. Contacts manager 24 provides various interfaces for managing contacts associated with the user, e.g., adding/deleting/editing users in a contacts lists, displaying/selecting contacts, grouping contacts, etc.

Additionally, an unknown contact manager 26 can be used to handle the case when a message arrives to the user 32 from a contact that is unknown, i.e., the contact is not in the user's contact list. Upon receipt of such a message, unknown contact manager 26 can prompt the user to selectively enable the requires confirmation option for subsequent messages sent to the unknown contact.

In general, computer system 10 may comprise, e.g., a desktop, a laptop, a workstation, etc. Moreover, computer system 10 could be implemented as part of a client and/or a server. Computer system 10 generally includes a processor 12, input/output (I/O) 14, memory 16, and bus 17. The processor 12 may comprise a single processing unit, or be distributed across one or more processing units in one or more locations, e.g., on a client and server. Memory 16 may comprise any known type of data storage and/or transmission media, including magnetic media, optical media, random access memory (RAM), read-only memory (ROM), a data cache, a data object, etc. Moreover, memory 16 may reside at a single physical location, comprising one or more types of data storage, or be distributed across a plurality of physical systems in various forms.

I/O 14 may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. Bus 17 provides a communication link between each of the components in the computer system 10 and likewise may comprise any known type of transmission link, including electrical, optical, wireless, etc. Although not shown, additional components, such as cache memory, communication systems, system software, etc., may be incorporated into computer system 10.

Access to computer system 10 may be provided over a network 36 such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

Figure 2:
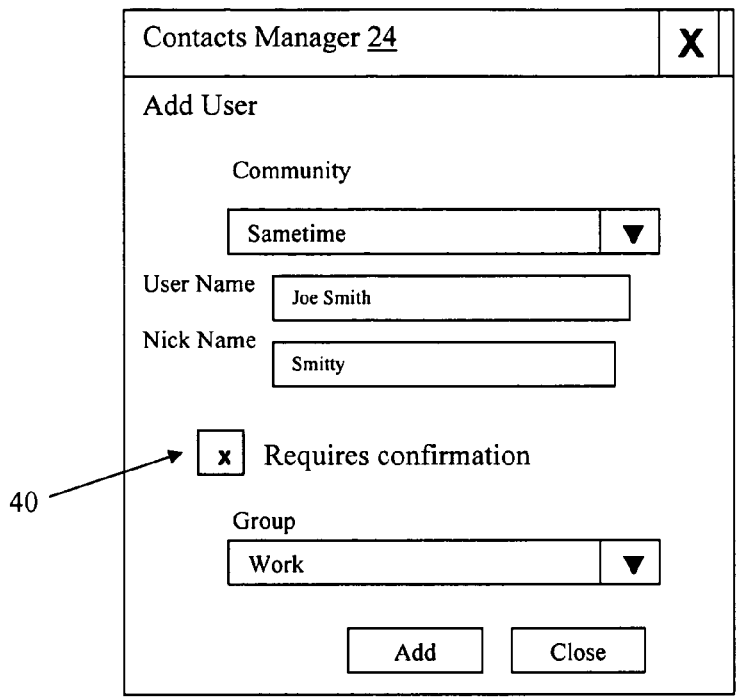
FIG. 2 depicts a contact manager interface for adding a user in accordance with the present invention.

Referring now to FIG. 2, an add user interface 38 within contacts manager 24 is shown for adding a new contact to a contact list associated with user 32. As can be seen, add user interface 38 includes a field for entering a user name (e.g., "Joe Smith") of the contact, a field for entering a nickname (e.g., "Smitty") of the contact, a dropdown menu for selecting a community (e.g., "Sametime"), and a dropdown menu for selecting/adding a group (e.g., "Work"). In addition, add user interface 38 includes a requires confirmation option 40 that can be selectively enabled via a check box. If the requires confirmation option 40 is enabled, then any message intended for the contact must first be confirmed by user 32 before the message can be sent to the contact.

It should be understood that the requires confirmation option 40 could be enabled from other interfaces (not shown) provided by the contact manager 24 or by other processes in the IM system 20, e.g., from an existing contacts list, in windows containing send or receive messages, etc. For instance, as noted above, unknown contacts manager 26 can be used to enable a requires confirmation option 40 for messages received from unknown users. Moreover, contact manager 24 could provide a mechanism for enabling the requires confirmation option 40 for a set of contacts, e.g., all users belonging to a group or community. Regardless of how it is enabled, once the requires confirmation option 40 is enabled for a contact, then any future messages sent to the contact by the user 32 must be confirmed by the user 32 within the send message interface 28.

Figure 3:
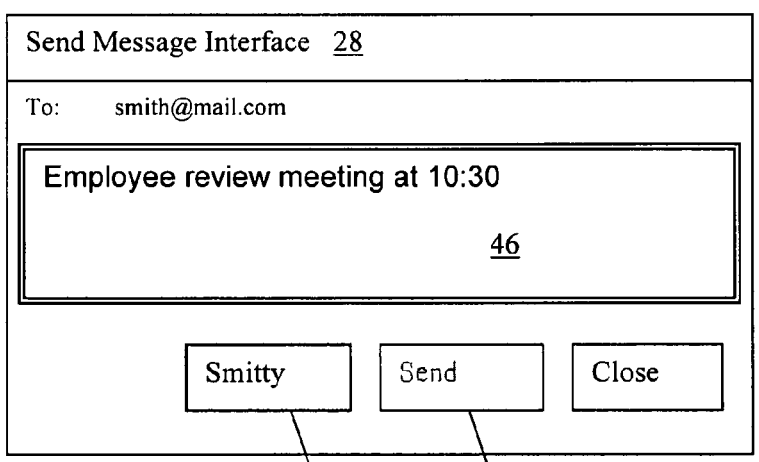
FIG. 3 depicts a send message dialog in accordance with the present invention.

FIG. 3 depicts an illustrative send message interface 28 for sending a message from within IM system 20. As can be seen, send message interface 28 includes a window 46 for entering a message, a send button 48 for sending the message to a contact 50, and a confirmation button 44 that is displayed if the requires confirmation option 40 is enabled for the contact 50, which is the case shown in FIG. 3. The confirmation button 44 is displayed with the name, e.g., nick name, user name, address, etc., of the recipient. In the example shown, the nick name "Smitty" appears on the confirmation button 44. Before the message can be sent, user 24 must "confirm" that the intended recipient of the message is correct by pressing the confirmation button 44. Once the message is confirmed, user 24 can send the message by pressing the send button 48.

It should be understood that confirmation button 44 is one illustrative example of implementing confirmation requirement 30, and any other mechanism could be implemented, e.g., a check box, a key stroke, voice recognition, etc.

In addition, when the requires confirmation option 40 is enabled and the confirmation button 44 is displayed, send button 48 is disabled until the confirmation button 44 is pressed. Once the confirmation button 44 is pressed, the send button 48 becomes enabled, and can be pressed to send the message. This forces the user 32 to make a visual and deliberate confirmation of the recipient of the message, thereby reducing the possibility of sending the message to the wrong person.

It should be appreciated that the teachings of the present invention could be offered as a business method on a subscription or fee basis. For example, a computer system 10 comprising IM system 20 could be created, maintained and/or deployed by a service provider that offers the functions described herein for customers. That is, a service provider could offer to provide an IM service as described above.

It is understood that the systems, functions, mechanisms, methods, engines and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. In a further embodiment, part of all of the invention could be implemented in a distributed manner, e.g., over a network such as the Internet.

The present invention can also be embedded in a computer program product, which comprises all the features enabling the implementation of the methods and functions described herein, and which—when loaded in a computer system—is able to carry out these methods and functions. Terms such as computer program, software program, program, program product, software, etc., in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. An instant messaging system, comprising:
a confirmation enablement system that allows a user to selectively enable a requires confirmation option for a contact associated with the user; and
a send message interface that displays a confirmation requirement for messages being sent to the contact within an instant messaging environment if the requires confirmation option is enabled, wherein the confirmation requirement must be confirmed by the user before the message can be sent, wherein the confirmation requirement comprises a confirmation button that can be confirmed by pressing the button, and wherein the confirmation button displays a name of the contact.

2. The instant messaging system of claim 1, wherein the confirmation enablement system comprises a checkbox.

3. The instant messaging system of claim 1, wherein the confirmation requirement is displayed in a same dialog as the message being sent to the contact.

4. The instant messaging system of claim 1, wherein the contact associated with the user is unknown to the user.

5. The instant messaging system of claim 1, wherein the send message interface includes a send button, wherein the send button is disabled until the confirmation button is pressed.

6. A computer program product stored on a computer readable medium for implementing an instant messaging system, comprising:
program code for allowing a user to selectively enable a requires confirmation option for a contact associated with the user; and
program code for displaying a confirmation requirement for messages being sent in an instant messaging environment to the contact if the requires confirmation option is enabled, wherein the confirmation requirement must be confirmed by the user before the message can be sent, wherein the confirmation requirement comprises a confirmation button that can be confirmed by pressing the button, and wherein the confirmation button displays a name of the contact.

7. The computer program product of claim 6, wherein the requires confirmation option is implemented as a checkbox.

8. The computer program product of claim 6, wherein the confirmation requirement is displayed in a same dialog as the message being sent to the contact.

9. The computer program product of claim 6, wherein the contact associated with the user is unknown to the user.

10. The computer program product of claim 6, wherein the send message interface includes a send button, wherein the send button is disabled until the confirmation button is pressed.

11. A method for implementing an instant messaging system, comprising:
enabling a requires confirmation option for a contact associated with a user;
writing a message to the contact; and
displaying a confirmation requirement for the message being sent to the contact, wherein the confirmation requirement must be confirmed by the user before the message can be sent, wherein the confirmation requirement comprises a confirmation button that can be confirmed by pressing the button, and wherein the confirmation button displays a name of the contact.

12. The method of claim 11, wherein the requires confirmation option is implemented as a checkbox.

13. The method of claim 11, wherein the confirmation requirement is displayed in a same dialog as the message being sent to the contact.

14. The method of claim 11, wherein the contact associated with the user is unknown to the user.

15. The method of claim 11, wherein the send message interface includes a send button, wherein the send button is disabled until the confirmation button is pressed.

16. A method for deploying an instant messaging application, comprising:
providing a computer infrastructure being operable to:
allow a user to selectively enable a requires confirmation option for a contact associated with the user; and
display a confirmation requirement for messages being sent within an instant messaging environment to the contact if the requires confirmation option is enabled, wherein the confirmation requirement must be confirmed by the user before the message can be sent, wherein the confirmation requirement comprises a confirmation button that can be confirmed by pressing the button, and wherein the confirmation button displays a name of the contact.

* * * * *